United States Patent
Peron

(10) Patent No.: US 12,015,137 B2
(45) Date of Patent: Jun. 18, 2024

(54) BATTERY AND METHOD FOR THERMAL REGULATION OF A BATTERY ONBOARD AN ELECTRIC VEHICLE

(71) Applicant: FORSEE POWER, Ivry-sur-Seine (FR)

(72) Inventor: Benoît Peron, Tours (FR)

(73) Assignee: FORSEE POWER, Ivry-sur-Seine (FR)

( * ) Notice: Subject to any disclaimer, the term of this patent is extended or adjusted under 35 U.S.C. 154(b) by 205 days.

(21) Appl. No.: 17/439,614

(22) PCT Filed: Feb. 18, 2020

(86) PCT No.: PCT/FR2020/050301
§ 371 (c)(1),
(2) Date: Sep. 15, 2021

(87) PCT Pub. No.: WO2020/188165
PCT Pub. Date: Sep. 24, 2020

(65) Prior Publication Data
US 2022/0158274 A1 May 19, 2022

(30) Foreign Application Priority Data
Mar. 15, 2019 (FR) ...................................... 19/02683

(51) Int. Cl.
*H01M 10/6572* (2014.01)
*H01M 10/625* (2014.01)
(Continued)

(52) U.S. Cl.
CPC ..... *H01M 10/6572* (2015.04); *H01M 10/625* (2015.04); *H01M 10/63* (2015.04);
(Continued)

(58) Field of Classification Search
CPC ........... H01M 10/6572; H01M 10/625; H01M 10/63; H01M 50/209; H01M 10/482;
(Continued)

(56) References Cited

U.S. PATENT DOCUMENTS 4,314,008 A 2/1982 Blake
2008/0280192 A1 11/2008 Drozdz et al.
(Continued)

FOREIGN PATENT DOCUMENTS

| CN | 103995236 A | * | 8/2014 | ............. Y02E 60/10 |
| CN | 209329095 U | * | 8/2019 | ............. Y02E 60/10 |

(Continued)

OTHER PUBLICATIONS

English Translation to International Search Report for Application No. PCT/FR2020/050301.
(Continued)

*Primary Examiner* — Kaity V Chandler
(74) *Attorney, Agent, or Firm* — Burris Law, PLLC

(57) ABSTRACT

Disclosed is a battery configured to electrically power at least one actuator or to receive electrical energy from at least one onboard actuator onboard an electrically autonomous vehicle, the battery including at least one battery element, the at least one battery element, being configured to store or restore electrical energy, the battery also comprising a thermoelectric device that is electrically connected to the at least one battery element, the thermoelectric device including: —a first heat-conducting portion placed in contact with the at least one battery element, —at least one thermoelectric cell, placed in contact with the heat-conducting portion, the at least one thermoelectric cell, being configured to produce a first positive or negative thermal power as a function of a first electrical current passing through the at least one thermoelectric cell, the first electrical current being provided
(Continued)

by the at least one battery element—a second heat-conducting portion placed in contact with the at least one thermoelectric cell and configured to dissipate a second thermal power generated by the at least one battery element, —at least one first sensor configured to measure a temperature of the at least one battery element, —a regulation module, the at least one first sensor being coupled to the regulation module, the regulation module being configured to control the first electrical current as a function of the target temperature of the at least one battery element such that a variation between the temperature measured by the at least one first sensor and the target temperature remains below a predetermined threshold.

11 Claims, 3 Drawing Sheets

(51) Int. Cl.
  *H01M 10/63*   (2014.01)
  *H01M 50/209*  (2021.01)
  *H01M 10/48*   (2006.01)
(52) U.S. Cl.
  CPC ........ *H01M 50/209* (2021.01); *H01M 10/482* (2013.01); *H01M 10/486* (2013.01); *H01M 2220/20* (2013.01)

(58) Field of Classification Search
  CPC ........... H01M 10/486; H01M 2220/20; H01M 10/6554; H01M 10/613; H01M 10/615; H01M 10/635; Y02E 60/10
  See application file for complete search history.

(56) References Cited

U.S. PATENT DOCUMENTS

| | | |
|---|---|---|
| 2014/0030560 A1 | 1/2014 | Lev et al. |
| 2015/0340746 A1 | 11/2015 | Origuchi et al. |
| 2020/0247252 A1* | 8/2020 | Dudar ................. H01M 10/615 |

FOREIGN PATENT DOCUMENTS

| | | | | |
|---|---|---|---|---|
| FR | 2986663 A1 | | 8/2013 | |
| GB | 2292828 A | * | 3/1996 | ............ H01M 10/44 |
| JP | 2012252887 A | | 12/2012 | |
| JP | 2019033051 A | * | 2/2019 | ............ Y02E 60/10 |

OTHER PUBLICATIONS

International Search Report for Application No. PCT/FR2020/050301.
Written Opinion for Application No. PCT/FR2020/050301.

* cited by examiner

BATTERY AND METHOD FOR THERMAL REGULATION OF A BATTERY ONBOARD AN ELECTRIC VEHICLE

CROSS REFERENCE TO RELATED APPLICATIONS

This application is a National Stage of PCT Application No. PCT/FR2020/050301 filed on Feb. 18, 2020, which claims priority to French Patent Application Ser. No. 19/02683 filed on Mar. 15, 2019, the contents each of which are incorporated herein by reference thereto.

TECHNICAL FIELD

The present invention concerns a device and a method for thermal regulation of a battery, in particular a battery for a vehicle, in particular for a collective transport vehicle.

BACKGROUND

It is known to cool down and/or heat up a battery using a fluid circulating inside a conduit, a portion of which winds in contact with a heat-conductive plate to respectively heat up or cool down the latter, the heat-conductive plate being in contact with the battery, and the fluid having being respectively heated up by an electrical resistance, or cooled down by successive phase-change cycles throughout a compressor and an expander. A motor-driven pump is necessary to ensure the circulation of the fluid. In particular, these known devices have the drawback of being electrical energy consumers, bulky, noisy, and barely reliable because of the numerous movable mechanical portions present in the compressor and the pump, these movable portions being at the origin of mechanical vibrations and wear. Furthermore, all fluids used in these devices are or will soon become forbidden by regulations, for environmental protection reasons.

BRIEF SUMMARY

Hence, the invention aims at providing a solution to all or part of these problems.

To this end, the present invention concerns a battery configured to electrically power at least one actuator or to receive electrical energy from at least one actuator onboard an electrically standalone vehicle, the battery comprising at least one battery element, the at least one battery element being configured to store or render an electrical energy, the battery also comprising a thermoelectric device electrically connected to the at least one battery element, the thermoelectric device comprising:
  a first heat-conductive portion placed in contact with the at least one battery element,
  at least one thermoelectric cell, placed in contact with the heat-conductive portion, the at least one thermoelectric cell being configured to produce a first thermal power, positive or negative according to a first electric intensity flowing through the at least one thermoelectric cell, the first electric intensity being supplied by the at least one battery element
  a second heat-conductive portion placed in contact with the at least one thermoelectric cell and configured to dissipate a second thermal power generated by the at least one battery element.
  at least one first sensor configured to measure a temperature of the at least one battery element,
  a regulation module, the at least one first sensor being coupled to the regulation module, the regulation module being configured to monitor the first electric intensity according to a target temperature of the at least one battery element, so that a deviation between the temperature measured by the at least one first sensor and the target temperature remains below a predetermined threshold.

According to these arrangements, the temperature of the battery is kept at a temperature close to the target temperature, without using a heat-transfer fluid forbidden by regulations, without any risk of leakages of this fluid. Furthermore, the thermal regulation device is less bulky, simpler and more robust than conventional devices based on a circulation of a heat-transfer fluid.

According to one embodiment, the invention comprises one or more of the following features, considered separately or according to any technically feasible combination.

According to one embodiment, the target temperature is comprised between 5 degrees and 35 degrees Celsius, when the ambient temperature outside the battery is comprised between −25 degrees and +55 degrees Celsius.

According to one embodiment, the at least one battery element comprises Lithium Titanium Oxide (LTO), or Nickel Manganese Cobalt (NMC), or Lithium Iron Phosphate (LFP), or Lithium Sulfur (LiS).

According to one embodiment, the at least one actuator comprises an electric motor.

According to one embodiment, the thermoelectric cell consists of a Peltier cell, comprising a N junction and a P junction.

According to one embodiment, the junction comprises Bismuth (Bi) associated to Antimony (Sb) for the N junction and Tellurium (Te) associated to Selenium (Se) for the P junction, in particular for possible operating temperatures of the junction comprised between 200° Kelvin and 450° Kelvin.

According to one embodiment, the junction also comprises Tellurium (Te), Silver (Ag), Germanium (Ge), Selenium (Se), Lead (Pb), Tin (Sn) and Silicon (Si) compounds to improve the performances of the thermoelectric effect by doping.

According to one embodiment, the regulation module comprises a switch configured to reverse the intensity flowing through the at least one thermoelectric cell so as to respectively control a heat or cold production at the level of the thermoelectric cell.

According to one embodiment, the second heat-conductive portion comprises a fan electrically connected to the at least one battery element, the fan being configured to make an air stream circulate in contact with the second heat-conductive portion, the air stream depending on the thermal power to be dissipated, the thermal power to be dissipated being estimated based on the thermoelectric model of the battery.

According to these arrangements, the heat evacuation is more effective, and the autonomy of the battery is optimized in comparison with a conventional cooling and heating device.

According to one embodiment, the thermoelectric device further comprises:
  a second sensor configured to measure an ambient temperature outside the at least one battery element,
  at least one third sensor configured to measure a second electric intensity flowing through the at least one battery element, and wherein the second and the at least one third sensors are coupled to the regulation module, the regulation module being configured to determine the first electric intensity according to the target temperature, the ambient temperature measured by the second sensor, and the second intensity measured by the at least one third sensor, based on a thermoelectric model of the battery, said thermoelectric model of the battery comprising a model of the at least one battery element.

According to these arrangements, the temperature of the battery elements is brought within a predetermined temperature interval around the target temperature according to an electrical energy efficient convergence process, which therefore improves the autonomy of the battery.

According to these arrangements, a pumping of the regulation automatism is avoided, which would have been at the origin of an inefficient convergence towards the target temperature, generating successive temperature deviations around the target temperature, which would reduce the service life of the battery and would excessively consume electrical energy.

According to one embodiment, the regulation module is configured to adjust a first thermal resistance of the thermoelectric model of the at least one battery element according to a deviation between the target temperature of the at least one battery element and the measured temperature of the at least one battery element, the target temperature being estimated from the model.

According to one embodiment, the target temperature is estimated according to a thermal power of the at least one battery element and a hot temperature of a hot wall of the thermoelectric cell.

According to one embodiment, the first thermal resistance is a thermal resistance of a contact area between a hot wall of the thermoelectric cell and the ambient environment.

According to one embodiment, an electric power of the thermoelectric cell is bounded by maximum and minimum limits of the target temperature of the at least one battery element.

According to one embodiment, the regulation module is configured to pursue a minimum of a derivative function of the electric power with respect to a cold temperature of the thermoelectric cell.

According to one embodiment, the electric power of the thermoelectric cell depends on the hot temperature of the thermoelectric cell and on the thermal power of the at least one battery element.

According to one embodiment, the thermal power of the at least one battery element is estimated according to the sum of the powers dissipated by the N batteries.

According to one embodiment, the hot temperature of the thermoelectric cell is estimated according to a sum of the thermal power of the at least one battery element and the electric power of the thermoelectric cell and flowing through the first thermal resistance.

According to one embodiment, the electric power of the thermoelectric cell flowing through the first thermal resistance corresponds to a thermal transfer function between the hot portion of the thermoelectric cell at the hot temperature and the environment at the ambient temperature According to one embodiment, the target temperature of the at least one battery element is estimated in real-time according to the current that flows through the at least one battery element, based on the thermoelectric model of the at least one battery element, according to a second thermal resistance between a cold contact area of the thermoelectric cell and the at least one battery element.

According to one embodiment, the regulation module is configured to adjust the maximum and minimum limits of the target temperature of the at least one battery element according to a relative humidity ratio of air and the ambient temperature.

According to these arrangements, the electric consumption extracted on the batteries used to power the thermoelectric cells to cool down or heat up the battery, is optimized.

According to these arrangements, the temperature of the battery is kept within the desired temperature range, with an optimized electric consumption.

According to these arrangements, water production is avoided in the vicinity of the electrical connection terminals of the battery, and in the battery through the lid used to manage the evacuation of gases therefrom in the event of a defect. The implementation of these arrangements allows overcoming the risk of short-circuit, on the one hand, between the positive and negative electrical connections of the battery itself and, on the other hand, between one of the positive or negative connections and the frame. This configuration is useful in particular in railroad applications where the negative potential of all batteries is connected to the frame. These arrangements allows avoiding water accumulation due to condensation or runoffs associated with surrounding dust which is often loaded with iron particles that might cause destructive short-circuits. The iron particles originate from dusts produced when braking the vehicle. They depend on the constitution of the materials used in brake systems.

According to one embodiment, the regulation module is configured to:
  estimate an estimated temperature of the at least one battery element from the thermoelectric model of the battery,
  compute a deviation between the estimated temperature and a measured temperature on the at least one battery element,
  if the deviation is greater than a determined threshold, update the thermoelectric model of the battery by estimating a value of at least one parameter of the thermoelectric model of the battery according to the temperature measured by the at least one first sensor.

According to one embodiment, the at least one parameter comprises an internal resistance of the at least one battery element.

According to one embodiment, the at least one parameter comprises the first thermal resistance of the thermoelectric model of the at least one battery element.

According to one embodiment, the estimated temperature of the at least one battery element is computed based on the thermoelectric model of the at least one battery element and on a thermoelectric model of the thermoelectric cell.

According to one embodiment, the thermoelectric model of the at least one battery element depends on the second thermal resistance between a cold contact area of the thermoelectric cell and the at least one battery element.

According to one embodiment, the thermoelectric model of the at least one battery element depends on the estimated internal resistance of the at least one battery element.

According to one embodiment, the estimated internal resistance of the at least one battery element depends on an elementary internal resistance of a battery element, and on the number of battery element constituting the at least one battery element, when the number is greater than or equal to two.

According to one embodiment, the thermoelectric model of the at least one battery element depends on a thermoelectric model of a cooling radiator placed in contact with a hot side of the thermoelectric cell.

According to these arrangements, the thermoelectric model of the battery is readjusted and updated when necessary.

According to one embodiment, the vehicle is a collective transport vehicle, preferably a rail vehicle.

According to one aspect, the invention concerns a battery assembly comprising a first battery according to any of the previously-described embodiments and a second battery according to any of the previously-described embodiments, the second heat-conductive portion of the first battery being in contact with the at least one thermoelectric cell of the second battery and being configured to absorb and evacuate the heat produced by the at least one battery element of the second battery, so that the first and second batteries have the same second heat-conductive portion in common.

These arrangements allow obtaining a better compactness of the assembly of the batteries, all else being equal, and in particular with identical performance.

According to one embodiment, the invention comprises one or more of the following features, considered separately or according to any technically feasible combination.

According to one embodiment, a plurality of battery assemblies are juxtaposed next to one another.

According to this embodiment, a plurality of batteries according to any of the preceding embodiments are assembled in pairs according to the previously-described embodiment of the assembly, and the pairs are juxtaposed next to one another, the second heat-conductive portion common to each battery pair being aligned so as to form one single channel for the passage of the forced air stream.

According to these arrangements, the compactness of the assembly is further improved.

According to another aspect, the invention also concerns a method for thermal regulation of a battery configured to electrically power at least one actuator or to receive the electrical energy from at least one actuator onboard an electrically standalone vehicle, the battery comprising:
  at least one battery element, the at least one battery element being configured to store or render an electrical energy,
  a thermoelectric device electrically connected to the at least one battery element, the thermoelectric device comprising:
  a first heat-conductive portion placed in contact with the at least one battery element,
  at least one thermoelectric cell, placed in contact with the heat-conductive portion, the at least one thermoelectric cell being configured to produce a first thermal power, positive or negative according to a first electric intensity flowing through the at least one thermoelectric cell, the first electric intensity being supplied by the battery element,
  a second heat-conductive portion placed in contact with the at least one thermoelectric cell and configured to dissipate a second thermal power generated by the at least one battery element,
  at least one first sensor configured to measure a temperature of the at least one battery element,
  a regulation module, the at least one first sensor being coupled to the regulation module, the regulation module being configured to monitor the first electric intensity according to a target temperature of the at least one battery element, the method comprising the following steps implemented by the regulation module:
  control a measurement of the ambient temperature;
  determine the first intensity according to the setpoint temperature, and the ambient temperature, so that a deviation between the temperature measured by the at least one first sensor and the target temperature remains below a predetermined threshold.

According to one implementation, the method comprises one or more of the following features, considered separately or according to any technically feasible combination.

According to an implementation of the method, the thermoelectric device further comprises:
  a second sensor configured to measure an ambient temperature outside the at least one battery element,
  at least one third sensor configured to measure a second electric intensity flowing through the at least one battery element,
  and wherein the second and the at least one third sensors are coupled to the regulation module,
  the method further comprising a step of controlling a measurement of the second intensity,
  and wherein at the step of determining the first intensity, the first intensity depends on the setpoint temperature, the ambient temperature and the second intensity, based on a thermoelectric model of the battery, the thermoelectric model of the battery comprising a model of the at least one battery.

According to an implementation of the method, the method further comprises the following steps:
  control a measurement of a temperature of the at least one battery element,
  estimate an estimated temperature of the at least one battery element from the thermoelectric model of the battery,
  compute a deviation between the estimated temperature and a measured temperature of the at least one battery element,
  if the deviation is greater than a determined threshold, update the thermoelectric model of the battery by estimating a value of at least one parameter of the thermoelectric model of the battery according to the measured temperature.

According to one implementation, the at least one parameter comprises an internal resistance of the at least one battery element.

According to these arrangements, the thermoelectric model of the battery is readjusted and updated when necessary.

BRIEF DESCRIPTION OF THE DRAWINGS

For a better understanding thereof, an embodiment and/or implementation of the invention is described with reference to the appended drawings representing, as a non-limiting example, an embodiment or implementation respectively of a device and/or of a method according to the invention. The same reference numerals in the drawings refer to similar elements or elements whose functions are similar.

DETAILED DESCRIPTION

To address the need of electric vehicles for electric power, a battery 1 is embedded on the vehicle to ensure storage and rendering of an electrical energy, which is consumed by one or several actuator(s), moved by at least one electric motor, and configured to drive the drive wheels of the vehicle, and/or other accessories of the vehicle. This electrical energy stored in the battery is produced by electrical charging devices external to the vehicle, or by the transformation, onboard the vehicle, of mechanical energy into electrical energy.

Figure 1:
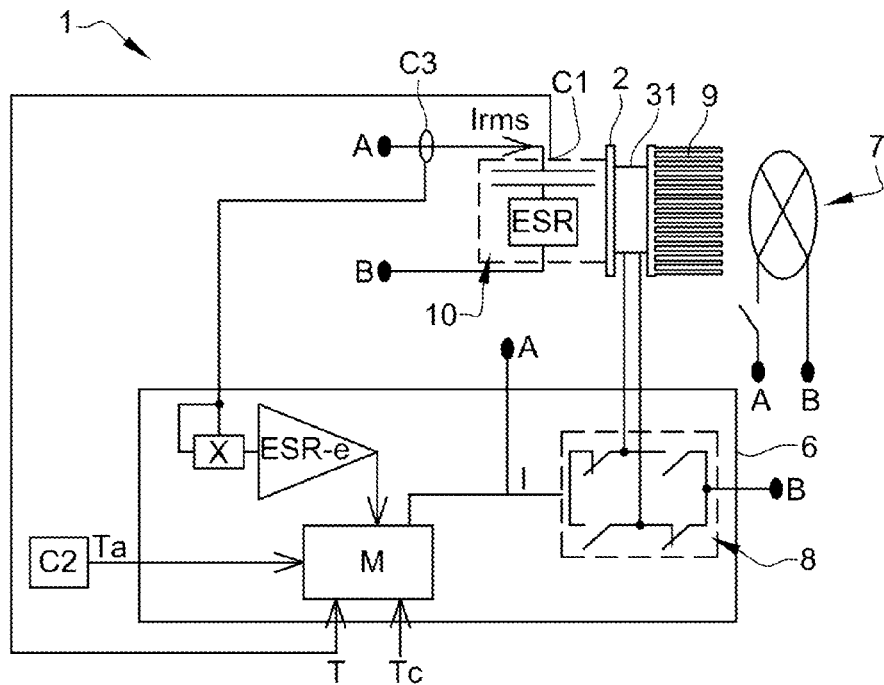
FIG. 1 is a simplified view of a battery according to the invention.
Figure 2:
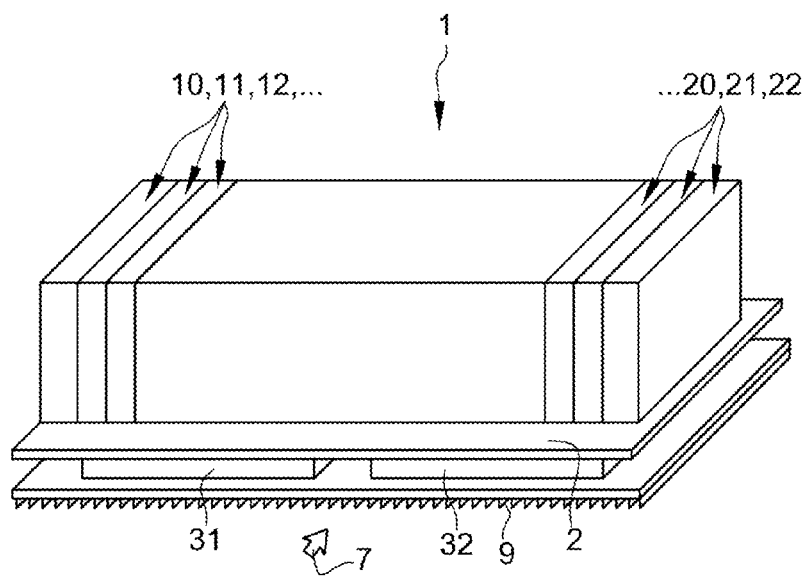
FIG. 2 is a perspective view of a battery according to the invention.

As illustrated in FIG. 2, a battery 1 embedded on a vehicle, generally comprises an assembly of battery elements 10, 11, 12, . . . , 20, 21, 22; FIG. 2 shows an example of a battery comprising 12 battery elements, but those skilled in the art should understand that this number is not limitative, and that the number of battery elements could be any number. Each battery element 10, 11, 12, . . . , 20, 21, 22 may comprise Lithium Titanium Oxide (LTO), or Nickel Manganese Cobalt (NMC), or Lithium Iron Phosphate (LFP), or Lithium Sulfur (LiS).

The battery elements 10, 11, 12, . . . , 20, 21, 22 of a battery may be electrically connected in series or in parallel so as to respectively supply an electric intensity or an electric voltage corresponding to the accumulation of respectively the electric intensities or electric voltages supplied instantaneously by each battery element 10, 11, 12, . . . , 20, 21, 22.

Each battery element 10, 11, 12, . . . , 20, 21, 22 of the battery 1 stores the electrical energy it receives during the electric charging periods, and renders the stored electrical energy, during the electric discharging periods. During these charging and discharging periods, each battery element 10, 11, 12, . . . , 20, 21, 22 of the battery 1 is crossed by an electric current Irms which is at the origin of a lost thermal energy released by the battery element 10, 11, 12, . . . , 20, 21, 22; the thermal power, i.e. the thermal energy, per unit of time, thus produced by each battery element 10, 11, 12, . . . , 20, 21, 22 is expressed as a function of an internal resistance ESR of the considered battery element.

This thermal power released by each battery element 10, 11, 12, . . . , 20, 21, 22 of the battery 1 must be dissipated in order to avoid an excessive heat-up phenomenon which is detrimental to the proper operation of the battery 1 as a whole. Conversely, when the ambient temperature Ta outside the battery 1 is very low, the operation of the battery elements 10, 11, 12, . . . , 20, 21, 22 is no longer optimum, and it is necessary to warm up the battery elements 10, 11, 12, . . . , 20, 21, 22 to bring them in a temperature range that is appropriate for a nominal operation of the battery elements 10, 11, 12, . . . , 20, 21, 22. As example, an appropriate temperature range may be comprised between 5 degrees and 35 degrees, while the ambient temperature could vary between −2 degrees and 55 degrees. To this end, one or several thermoelectric cell(s) 31, 32 are placed in contact with a first heat-conductive portion 2 and with a second heat-conductive portion 9, the first heat-conductive portion 2 being placed in contact with the battery elements 10, 11, 12, . . . , 20, 21, 22, and configured to promote heat exchanges between the battery elements 10, 11, 12, . . . , 20, 21, 22, on one side, and the thermoelectric cell(s) 31, 32, on the other side. The second heat-conductive portion 9 is placed in contact with the thermoelectric cell(s) 31, 32, preferably on another side of the thermoelectric cell(s) 31, 32 with respect to the contact plane between the thermoelectric cell(s) 31, 32 and the battery elements 10, 11, 12, . . . , 20, 21, 22; the second heat-conductive portion 9 serving to dissipate the thermal power generated by the battery elements 10, 11, 12, . . . , 20, 21, 22.

The first heat-conductive portion 2 is made of one of the heat-conductive materials, known to those skilled in the art.

The second heat-conductive portion 9 is also made of one of the heat-conductive materials, known to those skilled in the art; the second heat-conductive portion 9 could therefore comprises fins to promote the dissipation of the thermal power; the second heat-conductive portion 9 could further comprise a fan configured to create a forced air stream 7 to further improve the pursued heat dissipation.

The thermoelectric cell(s) 31, 32 placed between and in contact with the two heat-conductive portions 2, 9 preferably consist of Peltier cells; each Peltier cell is formed by a junction between a N junction and a P junction.

The junction may comprise Bismuth (Bi) associated to Antimony (Sb) for the N junction and Tellurium (Te) associated to Selenium (Se) for the P junction, in particular for possible operating temperatures of the junction comprised between 200° Kelvin and 450° Kelvin.

The junction may also comprise Tellurium (Te), Silver (Ag), Germanium (Ge), Selenium (Se), Lead (Pb), Tin (Sn), or Silicon (Si) compounds to improve the performances of the thermoelectric effect by doping.

When it is crossed by an electric current, the junction produces a positive or negative thermal energy, i.e. produces an amount of heat or cold, according to the intensity I of the current that flows through the junction of the Peltier cell.

According to one embodiment, the two materials that compose the junction are, for example, Lithium Titanium Oxide (LTO), or Nickel Manganese Cobalt (NMC), or Lithium Sulfur (LiS), or Bismuth Selenide (BiSe).

The intensity I of the electric current that flows through the junction of each thermoelectric cell 31, 32 is monitored by an electronic regulation module 6.

The regulation module 6 comprises a switch 8 configured to reverse the intensity I flowing through the thermoelectric cell(s) 31, 32 so as to respectively control a heat or cold production, i.e. a generation of positive or negative thermal energy, at the level of the thermoelectric cell 31, 32 crossed by the electric current with the intensity I.

The electronic regulation module 6 is connected to one or several sensor(s) C1 configured to measure a temperature representative of the internal temperature of each of the battery elements 10, 11, 12, . . . , 20, 21, 22 of the battery 1. For example, a temperature sensor C1 will be placed on each battery element 10, 11, 12, . . . , 20, 21, 22, for example at the level of an electrical connection having a low thermal resistance so that the temperature measured at this location is representative of the internal temperature of the considered battery element 10, 11, 12, . . . , 20, 21, 22.

The electronic regulation module 6 is also connected to a temperature sensor C2 configured to measure the ambient temperature Ta outside the battery 1.

The electronic regulation module 6 is also connected to one or several sensor(s) C3, each sensor C3 being configured to measure the electric intensity Irms of the electric current flowing through each battery element 10, 11, 12, . . . , 20, 21, 22. Thus, according to a first embodiment, the electronic regulation module 6 is configured to determine 102, and monitor accordingly, the intensity I of the electric current injected into the thermoelectric cell(s) 31, 32 according to the ambient temperature Ta measured outside the battery and a target temperature Tc so as to bring the temperature T of each battery element 10, 11, 12, . . . , 20, 21, 22 within an appropriate temperature interval around the target temperature.

The intensity I of the electric current injected into the thermoelectric cell(s) 31, 32 is extracted from the electrical energy supplied by one or several battery elements 10, 11, 12, . . . , 20, 21, 22 of the battery 1. Also, to optimize the autonomy of the battery 1, the temperature of the latter should be efficiently regulated, by avoiding in particular a pumping of the regulation automatism which would have been at the origin of an inefficient convergence towards the target temperature, generating successive temperature deviations around the target temperature, which would excessively consume electrical energy. Thus, according to a second embodiment, the electronic regulation module 6 is configured to determine 102, and monitor accordingly, the intensity I of the electric current injected into the thermoelectric cell(s) 31, 32 according to not only the ambient temperature Ta and a setpoint temperature Tc, but also the intensity Irms of the current flowing through each battery element 10, 11, 12, . . . , 20, 21, 22, based on a thermoelectric model M of the battery 1; the model M of the battery 1 comprises a model of each battery element 10, 11, 12, . . . , 20, 21, 22. A thermoelectric model M of the battery 1 comprising a model of each battery element 10, 11, 12, . . . , 20, 21, 22 is known to those skilled in the art, and is thus implemented in the regulation module 6 so that, having received as input data the ambient temperature Ta, the setpoint temperature Tc, and the intensity Irms of each battery element, the regulation module 6 computes the electric intensity I for the temperature T of each battery element 10, 11, 12, . . . , 20, 21, 22 to be brought within an appropriate temperature interval around the target temperature, according to an electrical energy efficient convergence process, which therefore improves the autonomy of the battery 1, in comparison with the first embodiment.

Figure 5:
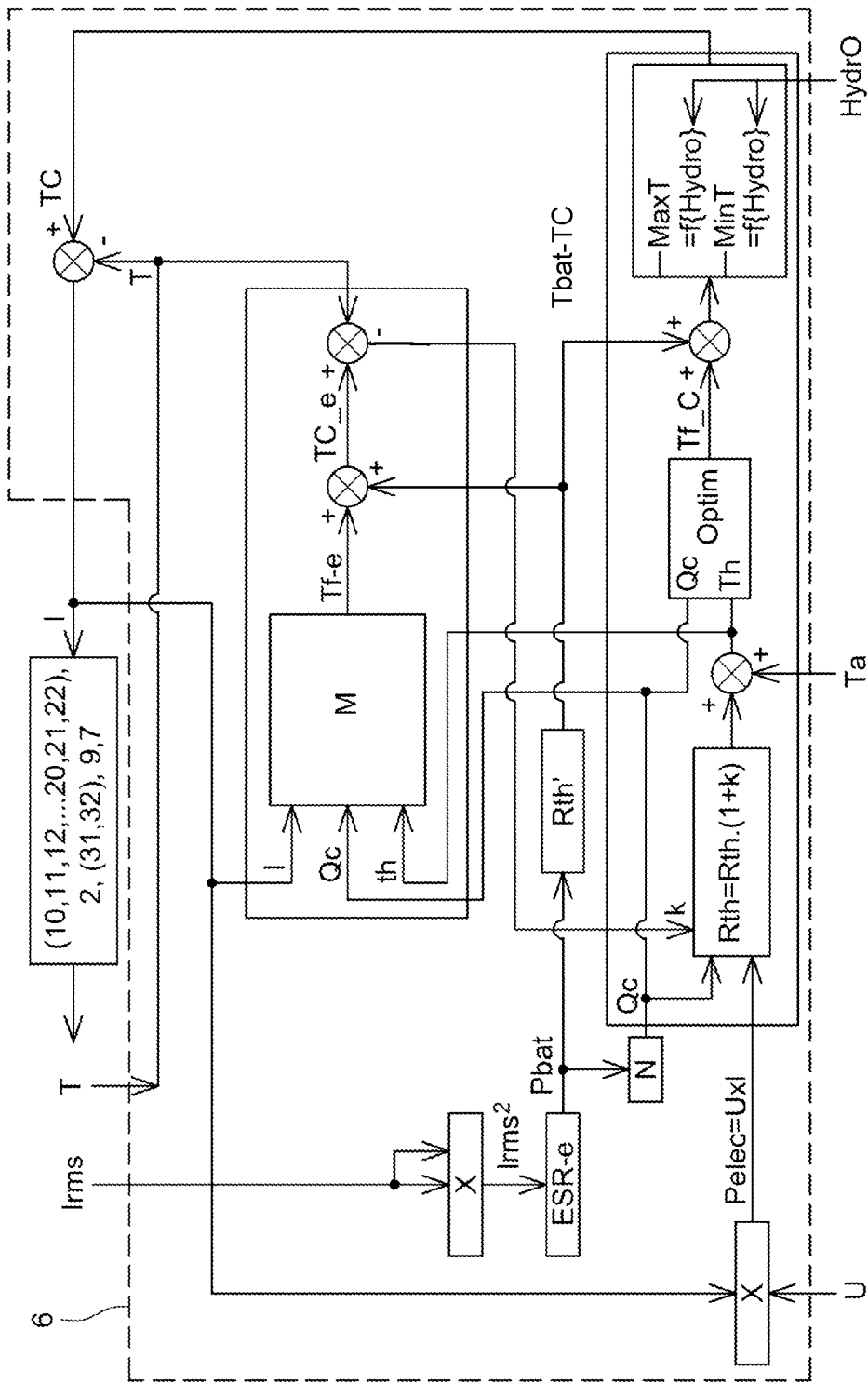
FIG. 5 is a diagram representative of another embodiment of the electronic regulation module.

An embodiment and an implementation of the regulation module 6 will now be described with reference to FIG. 5, to describe more specifically the temperature regulation method which allows optimizing the autonomy of the battery, by avoiding excessively extracting electric power on the battery for battery heating or cooling actions. This regulation method is based on an adjustment of a first thermal resistance parameter Rth of the model M, or first thermal resistance Rth, according to a deviation between an estimated temperature TC-e of the at least one battery element, from the model M, and a measured temperature T of the at least one battery element; the estimated temperature TC-e is determined by the regulation module 6, according to a thermal power Qc of the batteries and a temperature Th, called hot temperature, of a hot wall of the thermoelectric cell; the first thermal resistance Rth is the thermal resistance of the contact area between a hot wall of the thermoelectric cell and the ambient environment; the regulation method is based on three principles:

The first principle is a principle of optimization of the electric power of the thermoelectric cell; said electric power $P_{elec}$ of the thermoelectric is defined as the product of a voltage U measured at the terminals of the thermoelectric cell and the intensity I that flows through the thermoelectric cell.

The Target temperature Tc is bounded by the maximum MaxT and minimum MinT operating limits of the temperature of the battery. The regulation module 6 comprises an optimization module Optim, configured to pursue a minimum of the derivative function of the electric power with respect to a temperature, called cold temperature, Tf of the thermoelectric cell, according to:
the estimated hot temperature Th of the thermoelectric cell,
the power Qc coming in the thermoelectric cell,
the power Qc being estimated according to the sum of the powers dissipated by the N batteries and flowing through the thermoelectric cell,
with the temperature Th being estimated according to the sum:
of the power Qc
and of the power Pelec dissipated by the thermoelectric effect, and flowing through the first thermal resistance Rth corresponding to the thermal transfer function between the hot portion of the thermoelectric cell at the hot temperature Th and the environment at the ambient temperature Ta.

The second principle is based on a real-time estimation of the setpoint temperature of the battery, or target temperature TC, according to the current Irms that flows therethrough. This estimation is based on the thermal model of the battery according to a second thermal resistance Rth' of the contact area between the cold wall of the thermoelectric cell and the battery.

The third principle is based on an adjustment of the minimum MinT and maximum MaxT temperature limits of the setpoint temperature TC of the battery according to the relative humidity ratio of air HydrO with respect to Ta.

The effect of the implementation of the first principle is the limitation of the electric consumption extracted on the batteries used to power the thermoelectric cells related to the battery cooling or heating action.

The effect of the implementation of the second principle is the regulation of the temperature of the battery in the desired temperature range in connection with an optimized electric consumption thanks to the optimization module Optim.

The effect of the implementation of the third principle is the avoidance of the production of water in the proximity of the electrical connection terminals of the battery and in the battery through the lid used to manage the evacuation of gases therefrom in the event of a defect. The implementation of the third principle allows overcoming the risk of short-circuit, on the one hand, between the positive and negative electrical connections of the battery itself and, on the other hand, between one of the positive or negative connections and the frame. This configuration is present in particular in railroad applications where the negative potential of all batteries is connected to the frame. The implementation of the third principle allows avoiding water accumulation due to condensation or runoffs associated with surrounding dust which is often loaded with iron particles that might cause destructive short-circuits. The iron particles originate from dusts produced when braking the vehicle. They depend on the constitution of the materials used in brake systems.

According to one embodiment, the air stream 7 created by the fan of the second heat-conductive portion 9 depends on the thermal power to be dissipated, the thermal power to be dissipated being estimated by the electronic regulation module 6 based on the thermoelectric model M of the battery 1. According to these arrangements, the evacuation of heat is made more effective, and the autonomy of the battery is further improved.

The improvement of the autonomy of the battery is achieved with the previously-described embodiment of the battery 1, subject to the adaptation of the thermoelectric model M of the battery 1. Thus, according to a complementary embodiment, it will be possible to configure the regulation module 6 so as to check that the thermoelectric model M of the battery 1 is properly adapted, by comparing an estimate of the temperature T of a battery element 10, 11, 12, . . . , 20, 21, 22, estimated from the thermoelectric model M of the battery 2, with the temperature T measured by the sensor C1 configured to measure the temperature T of the considered battery element 10, 11, 12, . . . , 20, 21, 22. If the deviation between the temperature T estimated according to the model M and the measured temperature T' is greater than a predetermined threshold, while the electronic regulation module 6 is configured to adjust the value of a parameter of the thermoelectric model M of the battery 1, according to the measured temperature T' value. For example, the adjusted parameter may be an estimated internal resistance ESR-e of one of the battery elements 10, 11, 12, . . . , 20, 21, 22 of the battery 1. According to these arrangements, the thermoelectric model of the battery is readjusted and updated when necessary.

An embodiment of the correction of the first thermal resistance parameter Rth of the model M will now be described in more details. The principle consists in recreating the temperature of the battery by equivalent thermal and electro-thermal models:

1) of the battery, according to the second thermal resistance Rth', the estimated internal resistance ESR-e, a number N of battery elements constituting the battery,
2) of a radiator used for cooling, which is placed between the hot side of the thermoelectric cell and the environment at ambient temperature,
3) of the thermoelectric cell modeled according to the simplified mathematical model represented by the equation hereinbelow:

[Math 2]

$$T_c = \frac{Q_c + K.T_h - 273.\alpha.I + \frac{1}{2}R.I^2}{(\alpha.I + K)} R.I^2$$

Thus, the target temperature Tc is estimated and compared with the measured battery temperature T.

Two cases could be distinguished:

Case 1) if the deviation between the 2 values is too large, then one of the parameters of the system has evolved. In this case, the user will be informed on a drift and that a preventive maintenance operation will be necessary.

Case 2) if the deviation between the 2 values is within the limits of the model, one of the variables will be adjusted in real-time so that the deviation becomes zero.

For example, in railroad application, it is the thermal interface with the outside which is subject to fooling according to the seasons of the year. For example, in the spring, pollens could soil the radiator. Thus, an adjustment of the variable K of the first thermal resistance Rth will allow accurately quantifying the derivative of the first thermal resistance and defining whether a preventive maintenance operation should be necessary. Different levels of warning thresholds will be defined according to the magnitude of the parameter K yet without stopping the system. They will be adjusted depending on the application context.

In another environment, it could be preferably to adjust another sensitive parameter to ensure proper operation, in connection with the list of thermal and electro-thermal models mentioned hereinbelow:

1) of the battery, according to the second thermal resistance Rth', the estimated internal resistance ESR-e, a number N of battery elements constituting the battery,
2) of a radiator used for cooling, which is placed between the hot side of the thermoelectric cell and the environment at ambient temperature,
3) of the thermoelectric cell modeled according to the simplified mathematical model represented by the equation 6 hereinbelow.

Figure 3:
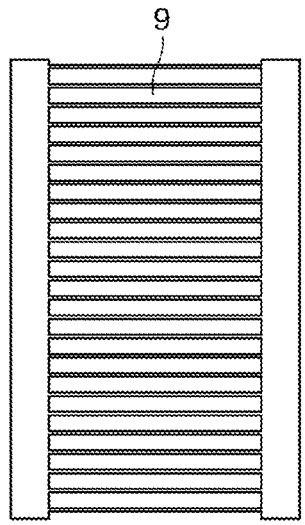
FIG. 3 is a perspective view of a battery according to the invention.

According to one aspect, the invention concerns an assembly of batteries comprising a first battery and a second battery according to any of the previously-described embodiments, the second heat-conductive portion 9 of the first battery being in contact with the thermoelectric cell(s) 31, 32 of the second battery and being configured to absorb and evacuate the heat produced by the at least one battery element 10, 11, 12, . . . , 20, 21, 22 of the second battery, so that the first and second batteries have the same second heat-conductive portion 9 in common. FIG. 3 schematically shows an example of a second heat-conductive portion 9 common to a first battery, not represented, which would be on one side, and a second battery, not represented, which would be on another side of this second heat-conductive portion 9.

These arrangements allow obtaining a better compactness of the assembly of the batteries, all else being equal, and in particular with identical performance.

According to one embodiment, a plurality of batteries according to any of the preceding embodiments are assembled in pairs according to the previously-described embodiment of the assembly, and the pairs are juxtaposed next to one another, the second heat-conductive portion common to each battery pair being aligned so as to form one single channel for the passage of the forced air stream.

According to these arrangements, the compactness of the assembly is further improved.

Figure 4:
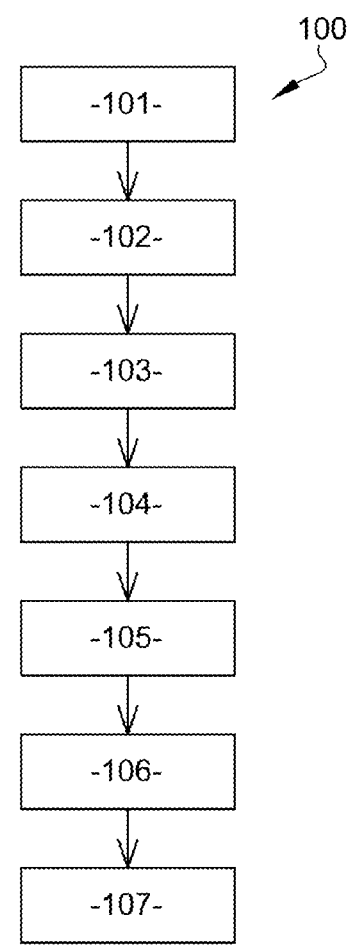
FIG. 4 is a simplified flowchart of a method according to the invention.

According to one aspect, the invention concerns a method 100 for thermal regulation of a battery according to any of the previously-described embodiments. The method 100 according to the invention will now be briefly described with reference to FIG. 4 which is a simplified flowchart of the steps of said method.

According to a first implementation, the method 100 comprises the following steps implemented by the regulation module 6:

control 101 a measurement of the ambient temperature Ta;
determine 102 the intensity I of the current flowing through the thermoelectric cell(s) 31, 32, according to the setpoint temperature Tc, and the ambient temperature Ta, so that a deviation between the measured temperature T and the target temperature Tc is below a predetermined threshold.

According to a second implementation, the method 100 further comprises a step of controlling 103 a measurement of the second intensity Irms, and the determination 102 of the first intensity I depends on the setpoint temperature Tc, the ambient temperature Ta and the second intensity Irms, based on a thermoelectric model M of the battery 1, the thermoelectric model M of the battery 1 comprising a model of the at least one battery 10, 11, 12, . . . , 20, 21, 22.

According to a third implementation, the method 100 further comprises the following steps:
control 104 a measurement of a temperature T of the at least one battery element 10, 11, 12, . . . , 20, 21, 22,
estimate 105 an estimated temperature of the at least one battery element 10, 11, 12, . . . , 20, 21, 22 from the thermoelectric model M of the battery 1
compute 106 a deviation between the estimated temperature and the measured temperature T of the at least one battery element 10, 11, 12, . . . , 20, 21, 22,
if the deviation is greater than a determined threshold, update 107 the thermoelectric model M of the battery 1 by estimating a value of at least one parameter of the thermoelectric model M of the battery 1 according to the measured temperature T.

The invention claimed is:

1. A battery configured to electrically power at least one actuator or to receive electrical energy from at least one actuator onboard an electrically standalone vehicle, the battery comprising at least one battery element the at least one battery element being configured to store or render an electrical energy, the battery also comprising a thermoelectric device electrically connected to the at least one battery element, the thermoelectric device comprising:
a first heat-conductive portion placed in contact with the at least one battery element,
at least one thermoelectric cell, placed in contact with the first heat-conductive portion, the at least one thermoelectric cell being configured to produce a first thermal power, positive or negative according to a first electric intensity flowing through the at least one thermoelectric cell, the first electric intensity being supplied by the at least one battery element,
a second heat-conductive portion placed in contact with the at least one thermoelectric cell and configured to dissipate a second thermal power generated by the at least one battery element,
at least one first sensor configured to measure a temperature of the at least one battery element,
a regulation module, the at least one first sensor being coupled to the regulation module, the regulation module being configured to monitor the first electric intensity according to a target temperature of the at least one battery element, so that a deviation between the temperature measured by the at least one first sensor and the target temperature remains below a predetermined threshold,
wherein the thermoelectric device further comprises:
a second sensor configured to measure an ambient temperature outside the at least one battery element,
at least one third sensor configured to measure a second electric intensity flowing through the at least one battery element, wherein the second sensor and the at least one third sensor are coupled to the regulation module, the regulation module being configured to determine the first electric intensity according to the target temperature, the ambient temperature measured by the second sensor, and the second intensity measured by the at least one third sensor, based on a thermoelectric model of the battery, the thermoelectric model of the battery comprising a model of the at least one battery element, and
the regulation module being configured to implement a temperature regulation method based on an adjustment of minimum and maximum temperature limits of a setpoint temperature of the battery according to the relative humidity ratio of air with respect to the ambient temperature.

2. The battery according to claim 1, wherein the regulation module is configured to:
estimate an estimated temperature of the at least one battery element from the thermoelectric model of the battery,
compute a deviation between the estimated temperature and a measured temperature on the at least one battery element,
if the deviation is greater than a determined threshold, update the thermoelectric model of the battery by estimating a value of at least one parameter of the thermoelectric model of the battery according to the temperature measured by the at least one first sensor.

3. The battery according to claim 1, wherein the electrically standalone vehicle is a collective transport vehicle.

4. A battery assembly comprising a first battery according to claim 1 and a second battery according to claim 1, the second heat-conductive portion of the first battery being in contact with the at least one thermoelectric cell of the second battery and being configured to absorb and evacuate heat produced by the at least one battery element of the second battery, so that the first battery and the second battery have the second heat-conductive portion in common.

5. A method for thermal regulation of a battery configured to electrically power at least one actuator or to receive electrical energy from at least one actuator onboard an electrically standalone vehicle, the battery comprising:
at least one battery element, the at least one battery element being configured to store or render an electrical energy,
a thermoelectric device electrically connected to the at least one battery element, the thermoelectric device comprising:
a first heat-conductive portion placed in contact with the at least one battery element,
at least one thermoelectric cell, placed in contact with the first heat-conductive portion, the at least one thermoelectric cell being configured to produce a first thermal power, positive or negative according to a first electric intensity flowing through the at least one thermoelectric cell, the first electric intensity being supplied by the at least one battery element,
a second heat-conductive portion placed in contact with the at least one thermoelectric cell and configured to dissipate a second thermal power generated by the at least one battery element,
at least one first sensor configured to measure a temperature of the at least one battery element,
a second sensor configured to measure an ambient temperature outside the at least one battery element,
at least one third sensor configured to measure a second electric intensity flowing through the at least one battery element,
and wherein the second sensor and the at least one third sensor are coupled to the regulation module,
a regulation module, the at least one first sensor, the second sensor, and the at least one third sensor being coupled to the regulation module, the regulation module being configured to monitor the first electric intensity according to a target temperature of the at least one battery element, the regulation module being configured to implement a temperature regulation method based on an adjustment of minimum and maximum temperature limits of a setpoint temperature of the battery according to the relative humidity ratio of air with respect to the ambient temperature, the method comprising the following steps implemented by the regulation module:
- controlling a measurement of an ambient temperature;
- determining the first electric intensity according to the target temperature, and the ambient temperature, so that a deviation between the temperature measured by the at least one first sensor and the target temperature remains below a predetermined threshold, and
- controlling a measurement of the second electrical intensity,
- wherein at the step of determining the first electric intensity, the first electric intensity depends on the target temperature, the ambient temperature and the second electrical intensity, based on a thermoelectric model of the battery, the thermoelectric model of the battery comprising a model of the at least one battery element.

6. The method according to claim 5, further comprising the following steps:
- control a measurement of a temperature of the at least one battery element,
- estimate an estimated temperature of the at least one battery element from the thermoelectric model of the battery
- compute a deviation between the estimated temperature and a measured temperature of the at least one battery element,
- if the deviation is greater than a determined threshold, update the thermoelectric model of the battery by estimating a value of at least one parameter of the thermoelectric model of the battery according to the measured temperature.

7. The battery according to claim 1, wherein the electrically standalone vehicle is a collective transport vehicle.

8. The battery according to claim 7, wherein the collective transport vehicle is a rail vehicle.

9. The battery according to claim 2, wherein the electrically standalone vehicle is a collective transport vehicle.

10. The battery according to claim 9, wherein the collective transport vehicle is a rail vehicle.

11. The battery according to claim 3, wherein the collective transport vehicle is a rail vehicle.

* * * * *